Nov. 24, 1959
J. E. SIMON
2,913,767
SELF TRIMMING TRANSFER MOLD
Filed Sept. 25, 1956
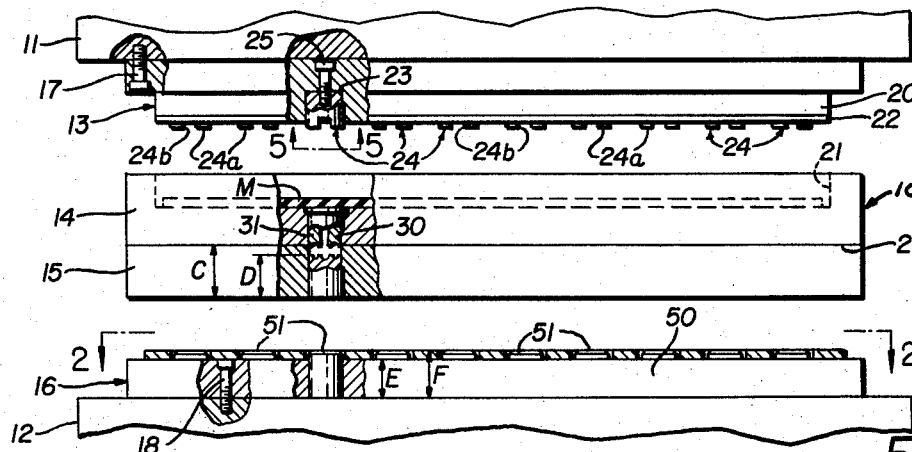
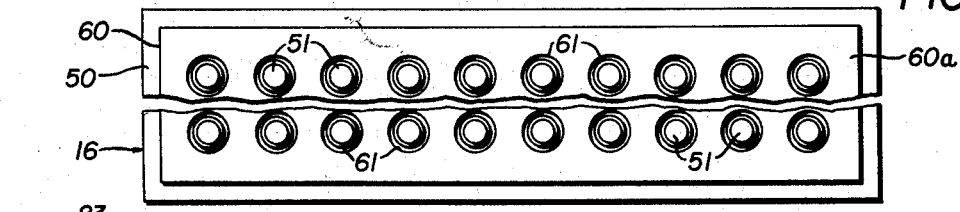
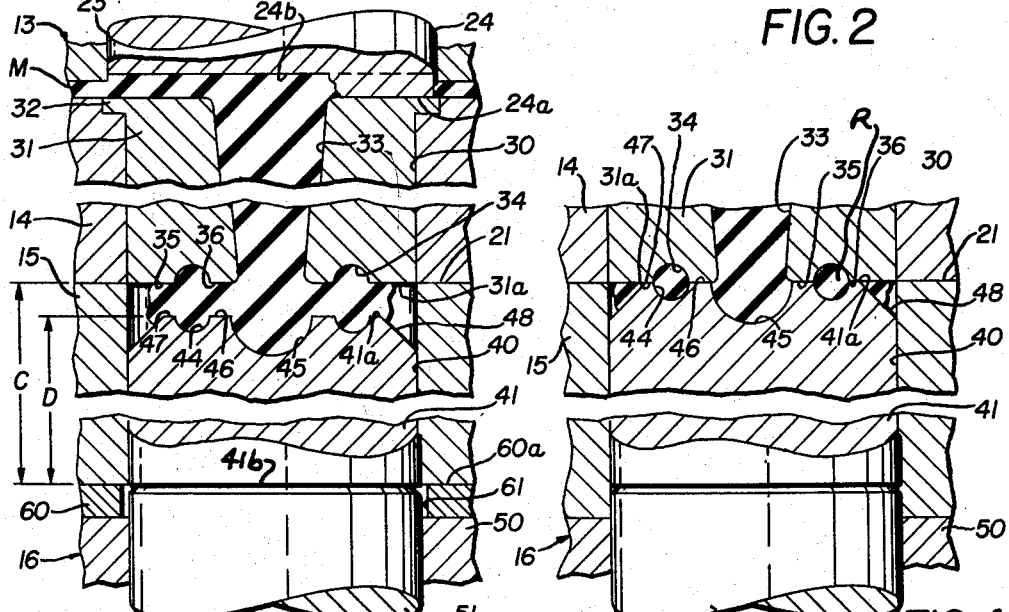
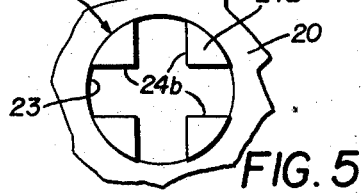
INVENTOR.
JAMES E. SIMON
BY
*J. William Freeman*
ATTORNEY

United States Patent Office 2,913,767
Patented Nov. 24, 1959

2,913,767

SELF TRIMMING TRANSFER MOLD

James E. Simon, Akron, Ohio

Application September 25, 1956, Serial No. 611,946

7 Claims. (Cl. 18—42)

This invention relates to molding devices and in particular has reference to improvements in transfer molding devices wherein a self-trimming of the molded parts is effectuated during the operation of the device.

In the art of molding, and in particular in the art of molding plastics of various compositions, two main problems have been encountered in the past. The first and foremost of these problems relates to "flash" that is produced at the juncture line of the mating mold sections. This "flash" must invariably be trimmed manually so as to permit the finish product to have a proper appearance.

The second problem encountered occurs most frequently in the recently developed art of transfer molding and has reference to "flow," with the viscosity of certain materials rendering difficult the transferring of the composition from a remote point to the molding cavity per se.

With respect to the solution of the problem of "flash," it has been attempted in the prior art to effectuate a self-trimming operation upon molded parts. Such efforts, however, have in the past been limited to use in compression type molds and feature the establishment of a cutoff point between the mold cavities that operates to trim the parts during the time that the same remain in the cavity.

In transfer molding, however, it has heretofore been impossible to utilize these known types of self-trimming devices because of the fact that the mold cavities had to remain open during the flow period to permit the entry of the transferred composition therein. As a result of remaining open to fluid flow, these parts were unable to be trimmed during the time that the same were in the mold with the result that any trim or cleaning action had to be effectuated separately after the molding operation was completed and the parts stripped from the mold.

With regard to the problem of flow, it has been customary in the art of transfer molding to provide a "gate" through which entry to the cavity is effectuated. The size of this "gate" necessarily had to be sufficient to permit fluid flow, and yet had to be small enough to avoid excess trimming and waste.

It has been discovered that a self-trimming operation can be effectuated in transfer molding by effectuating a shifting of one die after the filling operation that occurs upon flow of the composition. In this manner, the plastic composition is permitted to enter the cavity through an open gate and this "gate" is subsequently closed to simultaneously terminate plastic flow and effectuate a self-trimming action.

It accordingly becomes a principal object of this invention to provide an improved type of transfer mold having self-trimming features incorporated therein.

It is a still further object of the invention to provide a self-trimming transfer mold that is simple and efficient in operation to result in low-cost production.

These and other objects of the invention will become more apparent upon a reading of the following brief specification, considered and interpreted in the light of the accompanying drawings.

Of the drawings:

Figure 1 is a semi-schematic elevation view showing the improved molding device positioned between the upper and lower platens of a molding press.

Figure 2 is a view taken on the lines 2—2 of Figure 1.

Figure 3 is an enlarged section illustrating the condition of the die during the filling operation.

Figure 4 is a similar elevational view illustrating the position of the component parts after the self-trimming operation has occurred.

Figure 5 is a view on the lines 5—5 of Figure 1.

Referring now to the drawings and in particular to Figure 1 thereof, the improved molding device, generally designated by the numeral 10, is shown received between the upper and lower platens 11 and 12 of a molding press of known type and construction (not shown), with any one of several types of presses being satisfactory. As is illustrated in the broken-away portion of the drawings, the particular molding device 10 is shown designed to mold a plurality of annular rings of the type commonly referred to as O-rings.

To this end, the mold section 10 per se includes four plates designated by the numerals 13, 14, 15 and 16, with top plate 13 being attached by bolts 17 to upper platen 11 while lower plate 16 is attached by bolt 18 to the lower plate 12. In this regard, it is to be understood that the plates 14 and 15, which are the plates within which the actual molding is done, are freely removable with respect to the platens 11 and 12. However, it is to be understood that if desired, the four plates 13, 14, 15 and 16 above described, could be all hinged at one end so as to coact together to produce a device capable of being inserted within any type of press.

Considering first the top plate 13, it will be seen that the same is illustrated in this preferred embodiment of the invention as being of square configuration and includes a downwardly projecting portion 20 that is designed to be complementally received within an appropriate undercut 21 provided on the top surface of plate 14. This depending surface 20 may, if desired, include a brass strip 22 provided around its perimeter for insuring uniform wear when the parts are fitted together during the molding operation. In addition to the aforementioned component parts the top plate 13, which may be referred to as the plunger plate includes a series of counter-bored apertures 23, 23, that respectively receive therein hardened dies 24, 24 as well as a bolt 25 that may be employed, secures the same in fixed relationship with respect to the plate 13. These individual hardened dies are arranged in a series corresponding to the number of parts being made by each mold, and coact with equivalent counter-bored apertures and plugs that are provided in the remaining plates. Also, as shown in Figures 3 and 5, these dies 24, 24 have their end surface 24a provided with slots 24b, 24b, the arrangement being such that the end 24a of each die 24 may contact the top of the die 31 when the parts are as shown in Figure 4, to prevent the same shifting axially of plate 14. Thus, although such contact is made, the slots 24b, 24b provide an access by which material M can be directed to a point between plates 14 and 15 as will be described.

It has been previously indicated that the plate 14 is provided with an undercut 21 for the purpose of receiving therein an elongated strip of moldable material M. A similar set of counter-bored apertures 30, 30 communicate the recessed surface of undercut 21 with opposed face 21a, with the counter boring being provided to permit reception therein of a die member indicated generally in Figure 1 by the numeral 31. It is to be understood that this die member may be of any desired configuration but in the preferred embodiment of the invention shown herein, the same is shown as being of cylindrical configuration and includes an enlarged flange 32 that fits within each counter-bored aperture 30 to restrict axial movement thereof.

Additionally, as shown in Figure 3, each die 31 has a central aperture 33 through which the material M may flow when the plates 13 and 14 are brought into registry with each other under pressure. This aperture 33 opens in to the axial end wall 31a and is preferably tapered to facilitate removal of the spine formed thereby after the molding operation is complete. Also, the axial end wall 31a is provided with circular undercut 34 representing half of the cross-sectional configuration of an O-ring in this particular case, with land area 35 connecting the undercut portion 34 with the outer periphery of the die member 31 while the land area 36 connects undercut 34 with aperture 31 for purposes to be described.

It has been previously indicated that the plate 15 includes a corresponding number of complementally shaped die members that individually coact with the die members 31, 31 that have been just described. To this end, the plate 15 is shown provided with a series of cylindrical apertures 40, 40 that receive therein die members indicated generally by the numeral 41 in Figures 3 and 4 of the drawings.

It is important to note that the axial length of these die members, as represented by the dimension D, is slightly less than the thickness of the plate 15, as represented by the dimension C. This difference, normally in the nature of .025, permits the individual die members to shift axially of the apertures 40, 40 for purposes that will presently be described.

The individual die members 41, 41 are best shown in Figures 3 and 4 of the drawings as having their individual axial ends 41a, 41a provided with a circular undercut 44 that is complemental to the previously described undercut 34. Each surface 41a defines a dished cavity 45 with land area 46 interconnecting the cavities 45 with the cavity 44 while the outer periphery of the undercut 44 defines a land area 47 that terminates in a tapered surface 48; the arrangement being such that the land areas 36 and 46 are shown contacting each other in Figure 4 of the drawings with similar contact being obtained between the land areas 35 and 47 with the width of the land areas 46 and 47 being considerably less than that of the land areas 35 and 36 respectively, so as to permit a cutting action to occur.

The remaining component part of the mold 10 is the plate 16, and as best shown in Figure 1, this plate 16, which may be referred to as the pressure plate, in actuality includes a pair of plates usable together as will be presently described. To this end a base plate 50 is shown including therein an equivalent number of pin members 51, 51 that project above the plane of the base plate 50 for purposes to be described. In this regard, it is to be noted that the axial length of the pins 51, 51, as represented by the numeral F is slightly greater than the thickness of plate 50, as represented by the dimension E. This difference is normally in the neighborhood of .025 inch, although it has been found advantageous to make this difference slightly greater (.028) than the difference between the dimensions C and D that have been above described. By so doing, a firmer degree of cutting contact will be obtained between contacting land areas of the die surfaces 31a and 41a. Also, such difference permits trimming to occur even if some dirt or other foreign objects collect between the plates 14 and 15.

In order that the pins 51, 51 may be inactivated during the filling period, the plate 50 is further shown covered by a relatively thin plate 60 that, as shown in Figure 2, includes a plurality of apertures 61, 61 that are receivable around the individual pins 51, 51. In this manner, when the plate 60 is positioned on top of plate 50 as shown in Figures 1, 2 and 3, the top surface 60a of the plate 60 will be flush with the top of pins 51, 51.

In use or operation of the improved molding device, it will first be assumed that the plates 13 and 16 have been respectively secured to the top and bottom platens 11 and 12 of the molding press (not shown). It will further be assumed that appropriate handles, hinges and clamps have been provided on the mold sections 14 and 15 to permit the same to be positioned as shown in Figure 1 of the drawings. With the component parts thus assembled, the fastened plates 14 and 15 may be laid on top of the plate 60, with contact, as shown in Figure 3, being between the lower surface of the plate 15 and the plate 60 while the pins 51, 51 are just in contact with the die members 41, 41. At this time, the component parts are positioned as shown in Figure 3 and a strip of material M may be laid upon undercut surface 21 and the upper platen 11 moved downwardly so that the depending portion 20 of platen 13 comes in contact with the material M. As additional pressure is applied, the material M will, as shown in Figure 3, be forced downwardly through the individual die members 31, 31, with passage being through the center aperture 33. It is to be noted that the axial ends 31a and 41a of dies 31 and 41 respectively are spaced with respect to each other at this time due to the difference between the dimensions C and D which are representative of the thicknesses of the plate 15 and the length of the die members 41, 41 respectively. Accordingly, plastic flowing through the apertures 33, 33 will strike the dished surface 45 and be directed through a 360° "gate" that is defined by the space existing between the land areas 36 and 46. It is important to note that this "gate" is a full 360° with the result that a uniform fill can be obtained in the space between the cavities 34 and 44. A similar 360° "gate" exists at the outer periphery of the formed ring member as a result of the space existing between the land areas 35 and 47.

When the material has filled the space existing between the dies 31 and 41 as just described, the molds may be slightly opened and upon slight lowering of the plate 16, the plate 60 may be removed with respect to the plate 50. At this time, the mold may be closed and at this time the pins 51, 51 will contact the lower axial end 41b of the individual die members 41, 41. This contact, occurring as a result of the removal of the plate 60, will force the individual die members 41, 41 upwardly with the result that as additional pressure is applied, the component parts will assume the condition of Figure 4 wherein the land areas 36 and 46, as well as the land areas 35 and 47, will come into contact with each other. The making of this contact will, of course, effectuate a trimming action with the result that a perfectly formed annular ring R will be formed interiorly of the mold.

Upon opening of the mold section, the plates 14 and 15 may be removed from the press on rails, if desired, and upon removal of same, it is believed apparent that the O-rings may be easily and quickly removed from the die section with a minimum of effort, with the spines formed by apertures 23 easily being removed integral with the mat-like material M because of the taper in apertures 33, 33.

At this time, more material M may be placed in undercut 21 and the mold sections closed and the above procedure repeated for production of another group of O-ring members.

While a particular shape and configuration of product has been illustrated in connection with description of the self-trimming feature of this transfer molding device, it is to be specifically understood that the invention is not intended to be so limited. Accordingly, any design or configuration of article may be molded and trimmed, including discs, washers, or other articles commonly formed in the molding industry.

Similarly, where the term "plastic" has been used in this specification, it is to be understood that the same encompasses the use of any flowable material capable of use in molding devices.

It will be seen from the foregoing that there has been provided a new and novel type of molding device characterized by the presence of self-trimming means incorporated in combination and coaction with a transfer molding device. It has been shown how the use of transfer molding completely eliminates the manual steps of making up of sized capsules for individual placement in the die cavities with the operator merely being required, in transfer molding, to place a new piece of material M in the mold for each successive operation.

It has been shown how the novel self-trimming action occurring subsequent to the filling operation permits a 360° fill on either or both the I.D. and the O.D. of the part being molded with the result that adequate flow provision is made for any part regardless of shape or configuration.

Additionally, it has been shown how the shifting of the die parts and the further application of a cutting pressure by the shifted part permits a clean and effective trimming action to be obtained with the optimum cutting pressure being obtained as a result of difference in thickness of component parts employed. Additionally, the provision of a molding device that simultaneously functions to fill through a 360 degree gate, followed by an automatic and simultaneous trimming of I.D. and O.D. has been illustrated as producing a molded part requiring no further processing.

It accordingly follows that modifications of the invention may be resorted to without departing from the spirit hereof or the scope of the appended claims.

What is claimed it:

1. A molding device of the character described, comprising; a pair of complemental mold plates movable into and out of registry and having opposed die surfaces; one said die surface being movable relatively of the mold plate supporting the same into and out of registry with said remaining die surface; and means for moving said movable die surfaces into and out of registry with said remaining die surfaces while said mold plates are in registry.

2. A molding device of the character described for use with a press having first and second platens that are movable between open and closed positions, comprising a pair of registering mold plates; a first set of dies carried by one said plate and having a flow passage therethrough; a second complemental set of dies carried by said remaining plate in shiftable relationship therewith; a plunger plate carried by said first platen and being registrable with an exposed surface of said mold plate having said fixed dies; a pressure plate carried by said second platen and having projections on one surface thereof engageable with said movable dies; and an apertured spacer plate positionable on said pressure plate with said projections thereof being fully housed within said apertures, whereby said spacer plate prevents contact between said projections and said shiftable dies upon movement of said platens to said closed position; said movable dies having a length dimension less than the thickness of the plate receiving the same; said projections shifting said shiftable dies into registry with said remaining dies upon removal of said spacer plate from said pressure plate followed by movement of said platens to closed position.

3. The device of claim 2 further characterized by the fact that the projecting dimensions of said projections approximates the dimensional difference between said movable dies and the thickness of the plate carrying the same.

4. A molding device of the character described for use with a press having first and second platens that are movable between open and closed positions, comprising; first and second mold plates disposed respectively adjacent said first and second platens and each having opposed planar surfaces; a first set of dies carried by said first plate between the opposed planar surfaces thereof and having a flow passage therethrough; a second complemental set of dies carried by said second plate in shiftable relationship therewith; said second die members being of a length less than the distance between the opposed planar surfaces of said second plate whereby said second die members may be moved from spaced to engaging relationship with said first die members during the period that said plates are in registry.

5. A molding device of the character described for use with a press having first and second platens that are movable between open and closed positions, comprising; first and second mold plates disposed respectively adjacent said first and second platens and each having opposed planar surfaces; a first set of dies carried by said first plate between the opposed surfaces thereof and having a flow passage therethrough; a second complemental set of dies carried by said second plate in shiftable relationship therewith; said second die members being of a length less than the distance between the opposed planar surfaces of said second plate whereby said second die members may be moved relatively of said first die members during the period that said plates are in registry.

6. The device of claim 5 further characterized by the fact that said die members when positioned in said spaced condition define a cavity into which molding material may be supplied from said passage.

7. The device of claim 6 further characterized by the fact that communication between portions of said cavity and said passage is terminated upon movement of said die members into engaging relationship with each other.

References Cited in the file of this patent

UNITED STATES PATENTS

| 2,072,349 | Wayne | Mar. 2, 1937 |
| 2,354,241 | Anderson | July 25, 1944 |
| 2,531,888 | Nye | Nov. 28, 1950 |
| 2,558,027 | Wilson | June 6, 1951 |
| 2,607,080 | Stewart | Aug. 19, 1952 |
| 2,717,793 | Nenzell | Sept. 13, 1955 |
| 2,724,865 | Mills | Nov. 29, 1955 |

FOREIGN PATENTS

| 494,108 | Canada | June 30, 1953 |
| 241,725 | Switzerland | Aug. 1, 1946 |